United States Patent
Koganezawa et al.

(10) Patent No.: US 6,671,120 B2
(45) Date of Patent: Dec. 30, 2003

(54) HEAD CARRIAGE ASSEMBLY DRIVE SYSTEM AND DISK DRIVE

(75) Inventors: Shinji Koganezawa, Kawasaki (JP); Tomoyoshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/426,092

(22) Filed: Oct. 22, 1999

(65) Prior Publication Data
US 2003/0151845 A1 Aug. 14, 2003

(30) Foreign Application Priority Data
Feb. 9, 1999 (JP) .......................... 11-031745

(51) Int. Cl.⁷ .............................................. G11B 5/596
(52) U.S. Cl. ................................. 360/78.05; 360/675
(58) Field of Search .................. 360/78.05, 75, 360/63, 78.12, 77.04, 294.4; 369/44.11, 44.28; 318/560

(56) References Cited

U.S. PATENT DOCUMENTS

| | | | | |
|---|---|---|---|---|
| 4,145,725 A | * | 3/1979 | Wallis | 360/106 |
| 5,452,275 A | * | 9/1995 | Ogawa | 369/44.11 |
| 6,034,834 A | * | 3/2000 | Yoshikawa et al. | 360/75 |
| 6,088,187 A | * | 7/2000 | Takaishi | 360/78.05 |
| 6,160,676 A | * | 12/2000 | Takaishi | 360/78.05 |
| 6,292,320 B1 | * | 9/2001 | Mason et al. | 360/63 |
| 6,295,184 B1 | * | 9/2001 | Takekado | 360/294.4 |
| 6,320,720 B1 | * | 11/2001 | Hattori | 360/78.05 |
| 6,483,659 B1 | * | 11/2002 | Kobayashi et al. | 360/78.04 |

FOREIGN PATENT DOCUMENTS

JP 4311887 11/1992

* cited by examiner

*Primary Examiner*—David Hudspeth
*Assistant Examiner*—K. Wong
(74) *Attorney, Agent, or Firm*—Greer, Burns & Crain, Ltd.

(57) ABSTRACT

A head carriage assembly drive system has a head carriage assembly having a head, a head carriage for moving the head in a radial direction of a rotating disk, a first drive unit for generating the power to rotate the head carriage and a second drive unit having a torque constant smaller than the torque constant of the first drive unit. Mainly the first drive unit is operated in a low-frequency band and mainly the second drive unit is operated in a high-frequency band, thereby reducing overall power consumption during tracking.

8 Claims, 18 Drawing Sheets

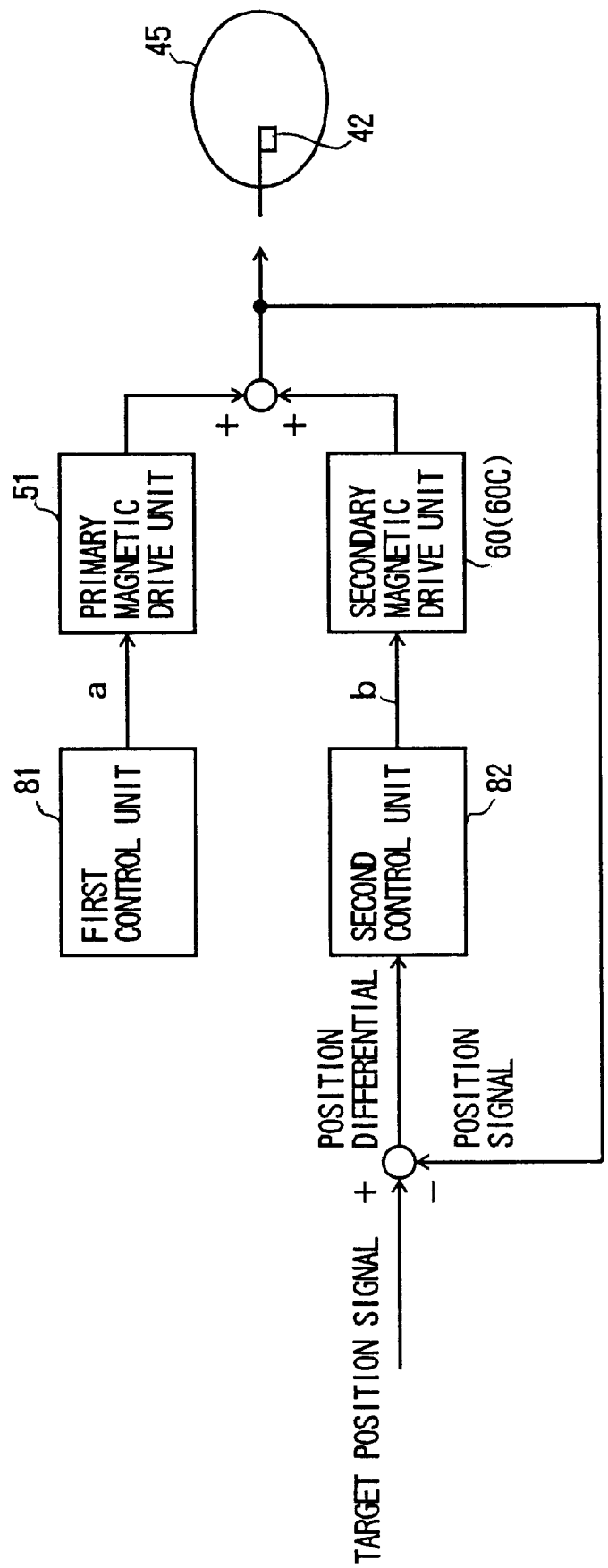
F I G. 1

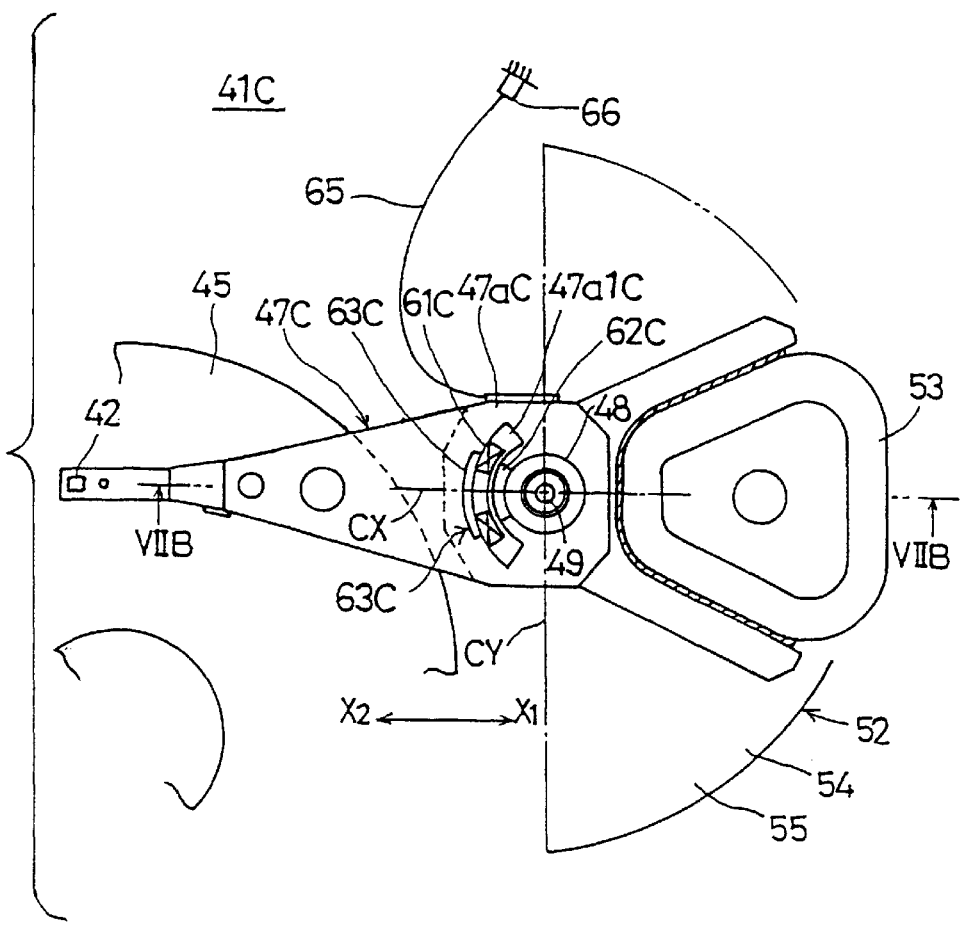
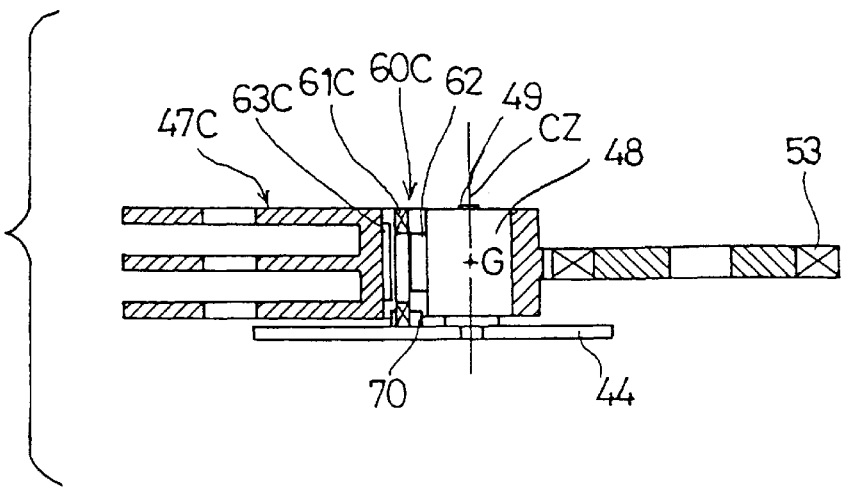

HEAD CARRIAGE ASSEMBLY DRIVE SYSTEM AND DISK DRIVE

BACKGROUND OF THE INVENTION

1. Field of the Invention

The present invention relates generally to a head carriage assembly drive system and disk drive, and more particularly, to a head carriage assembly drive system and disk drive suitable for high-density recording.

2. Description of the Related Art

At present, high-density recording is being introduced to 3.5-inch and other types of magnetic disk drives. In order to increase the recording density, however, it is necessary to increase the number of tracks per unit length of magnetic disk, or TPI, and increasing TPI decreases the width of each track and requires a consequent enhancement in the accuracy with which the magnetic head is positioned. Increasing the TPI to 25,000, for example, reduces the track pitch to 1 $\mu$m, requiring the positional accuracy of the magnetic head to be within 0.1 $\mu$m. Additionally, such magnetic head positional accuracy should be accomplished with a reduced consumption of power because the magnetic disk drive is operated by a battery mounted in a laptop-type computer.

Conventionally, however, it is difficult to accomplish such accuracy with reduced power consumption due to the configuration of the conventional head carriage assembly drive system.

SUMMARY OF THE INVENTION

Accordingly, it is an object of the present invention to provide a head carriage assembly drive system and disk drive in which the problem of obtaining a reduction in energy consumption as described above is solved.

The above-described object of the present invention is achieved by providing a head carriage assembly drive system for driving a head carriage assembly during a tracking/seek operation, the head carriage assembly drive system comprising:

- a first drive unit for generating force to rotate a head carriage of the head carriage assembly, the first drive unit being provided, with respect to a pivot, on a side of the head carriage opposite a side on which a head is provided;
- a second drive unit positioned at a position other than a position at which the first drive unit is positioned, the second drive unit having a torque constant or torque smaller than a torque constant or torque of the first drive unit; and
- a control unit assigning mainly the first drive unit to operate in a low-frequency band and mainly the second drive unit to operate in a high-frequency band.

According to the head carriage assembly drive system described above, it is possible to greatly reduce power consumption compared to when only the second drive unit is used for tracking operation. The first drive unit operates only in the low-frequency band, so of the drive forces generated by the first drive unit the drive force of the primary resonance frequency that is the lateral mode caused by the bearing is small, and so the drive of the first drive unit does not cause the head carriage assembly to resonate. Additionally, the second drive unit has a small torque constant, with a primary resonance peak that is small. Control in the high-frequency bandwidth is performed by activating the second drive unit. Accordingly, tracking can be conducted with the same high degree of accuracy as when only the second drive unit is used.

Further, the above-described object of the present invention is also achieved by providing the head carriage assembly drive system comprising the first and second drive units as described above, wherein the control unit assigns the first drive unit to operate with respect to an eccentricity of the disk track and the second drive unit to operate with respect to other than an eccentricity of the disk track.

According to the head carriage assembly drive system described above, it is possible to greatly reduce power consumption compared to when only the second drive unit is used for tracking operation. The first drive unit operates only at the rotational frequency of the disk and therefore does not resonate at the frequency of the head carriage assembly (approximately 3–5 KHz). Additionally, the second drive unit has a small torque constant, with a primary resonance peak that is small, and therefore is suitable for control through high-frequency bands. Accordingly, tracking can be conducted with the same high degree of accuracy as when only the second drive unit is used.

Additionally, the above-described object of the present invention is also achieved by providing a head carriage assembly drive system comprising the first and second drive units as described above, wherein the a control unit assigns the first drive unit to operate so as to supply a rotational force sufficient to offset a bias rotational force acting on the head carriage assembly, the second drive unit being driven to make the head follow the track on the disk.

According to the head carriage assembly drive system described above, power consumption can be greatly reduced compared to a case in which only the second drive unit is made to generate a rotational force to offset the rotational force caused by the cable while also being driven to make the head follow the track on the disk.

Further, the above-described object of the present invention is also achieved by providing a head carriage assembly drive system comprising the first and second drive units as described above, wherein the control unit assigns the first drive unit to detect a speed of movement of the head and assigns only the second drive unit to drive the head.

By using the first drive means to detect the speed of movement of the head, the need for a velocity estimator is eliminated, as is the need for the calculations performed by the estimator. Additionally, the speed of movement of the head is detected directly, making it possible to provide a more robust servo system. Moreover, calculation time is shortened and current flow begins quickly, providing accurate positioning and stable tracking.

Additionally, the above-described object of the present invention is also achieved by providing a head carriage assembly drive system comprising the first and second drive units as described above, wherein:

- the second drive unit has a torque constant smaller than a torque constant of the first drive unit and generates a force that is the reverse of a force generated by the first drive unit, and the control unit; and
- drive current sent to the first drive unit and drive current sent to the second drive unit, the values of the first and second drive unit currents being substantially inversely proportional to the torque constants of the first and second drive units.

According to the head carriage assembly drive system described above, the drive currents supplied to the first drive unit and the second drive unit are largely in inverse proportion to the torque constants of the drive units, and thus the force generated by the first drive unit and the force generated by the second drive unit are of equal size. As a result, the lateral forces acting on the pivot are cancelled out and only the torque of the periphery of the pivot acts on the head carriage. Accordingly, the lateral mode arising from the rigidity of the ball bearing is not excited and the servo bandwidth is increased, head slider positioning accuracy is increased and tracking accuracy improved.

Further, the above-described object of the present invention is also achieved by providing a head carriage assembly drive system for driving a head carriage assembly when making a head seek a target track on a disk during a seek operation, the head carriage assembly drive system comprising:

a first drive unit for generating force to rotate a head carriage of the head carriage assembly, the first drive unit being provided, with respect to a pivot, on a side of the head carriage opposite a side on which a head is provided;

a second drive unit having a torque constant smaller than a torque constant of the first drive unit; and a control unit assigning the second drive unit to detect a speed of movement of the head and assigning only the first drive unit to drive the head.

According to the head carriage assembly drive system described above, using the second drive unit to detect the speed of movement of the head results in continuous speed information, eliminates the calculations by a digital signal processor (DSP) hitherto required in the conventional art, shortens the calculating time and thereby reduces the burden on the servo system by an equivalent amount. As a result, the seeking of a target track by the head is performed more stably and more smoothly than is the case with the conventional art.

BRIEF DESCRIPTION OF THE DRAWINGS

Other objects, features and advantages of the present invention will become more apparent from the following detailed description when read in conjunction with the accompanying drawings, in which:

FIG. 1 is a block diagram for explaining the drive system of the head carriage assembly according to a first embodiment of the present invention;

FIGS. 7A and 7B are diagrams showing a second magnetic head carriage assembly using the drive system of FIG. 1;

DESCRIPTION OF THE PREFERRED EMBODIMENTS

In order to facilitate understanding of the present invention a description will first be given of related art. The related art has a magnetic head carriage assembly and a control mechanism. The magnetic head carriage assembly is equipped with a magnetic head carriage that is itself equipped with a magnetic head, the magnetic head carriage moving the magnetic head, rotatably supported by a pivot, in the radial direction of a rotating disk. In addition, the magnetic head carriage assembly has a first drive unit and a second drive unit for generating the power to rotate the head carriage, the first drive unit being provided, with respect to the pivot, on a side opposite the side on which the magnetic head is positioned, and the second drive unit being positioned at a position other than the position at which the first drive unit is mounted. The control mechanism operates the first drive unit during a seek operation and operates the second drive unit during a tracking operation.

In the above-described magnetic disk drive, the lateral force during the tracking operation is of a direction that has little effect on the positioning of the magnetic head slider on the track, and accordingly, the magnetic head slider can be positioned with a high degree of accuracy with respect to the track and tracking can be performed accurately.

It should be noted that the second drive unit is provided as an auxiliary, and accordingly, the torque constant, that is, the torque generated by a predetermined drive current, of this second drive unit is substantially smaller than the torque constant of the second drive unit. Accordingly, tracking by use of the first drive unit alone does not result in the desired reduction in power consumption.

The present invention overcomes the above-mentioned problem.

A detailed description will now be given of a first embodiment of the present invention. In order to facilitate the understanding of the present invention, a description will first be given of a first and second magnetic head carriage assembly and a magnetic disk drive having the head carriage assembly drive system according to this first embodiment of the present invention.

Figure 4:
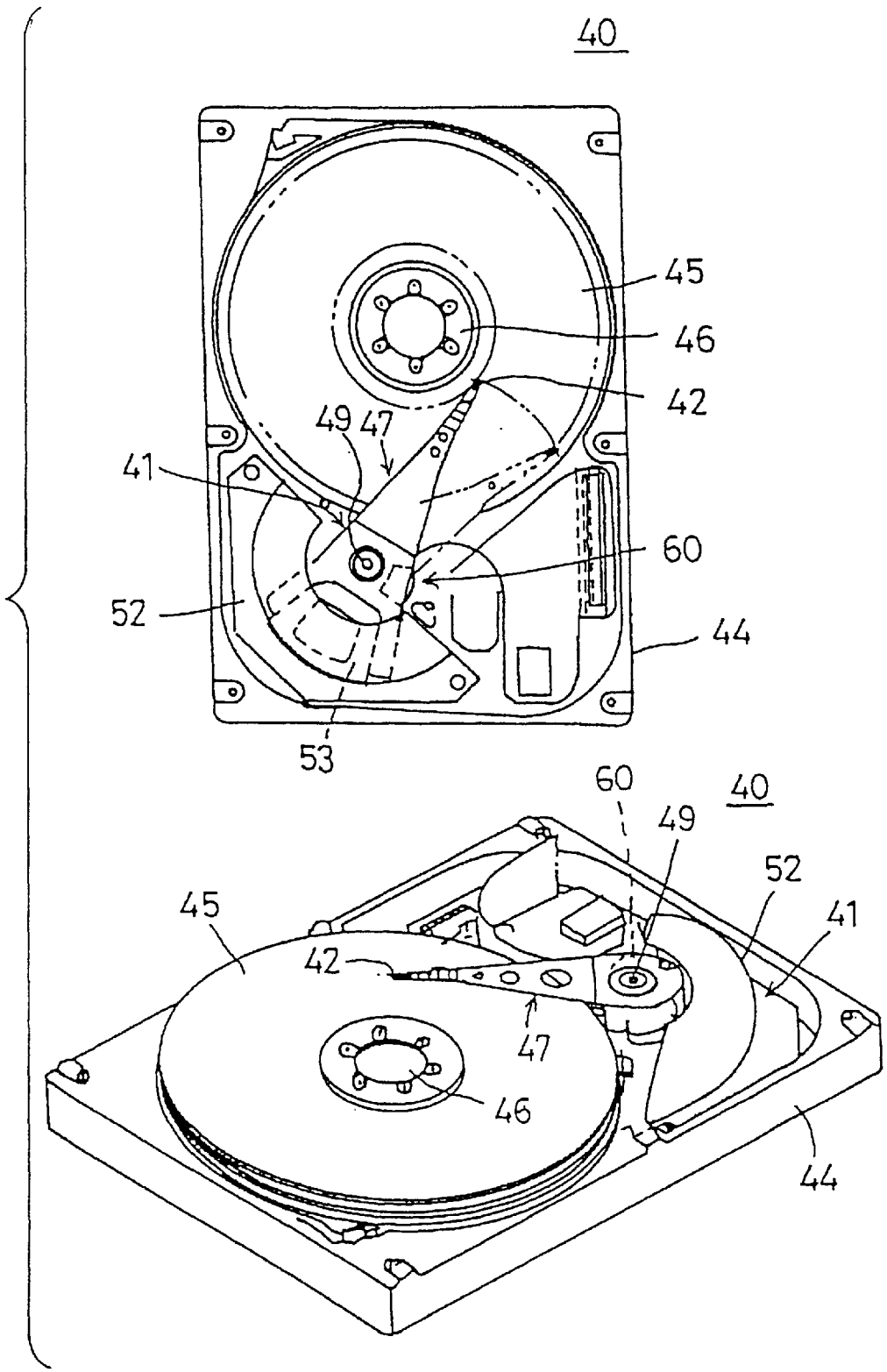
FIG. 4 is a diagram of a magnetic disk drive having the magnetic head carriage assembly of FIGS. 3A and 3B.

FIG. 4 shows a first magnetic disk drive 40. The magnetic disk drive 40 is constructed so that a magnetic disk 45 is rotatably mounted on a spindle 46 inside a box-shaped chassis base 44, such that a first magnetic head carriage assembly 41 is included therein.

Figure 3A:
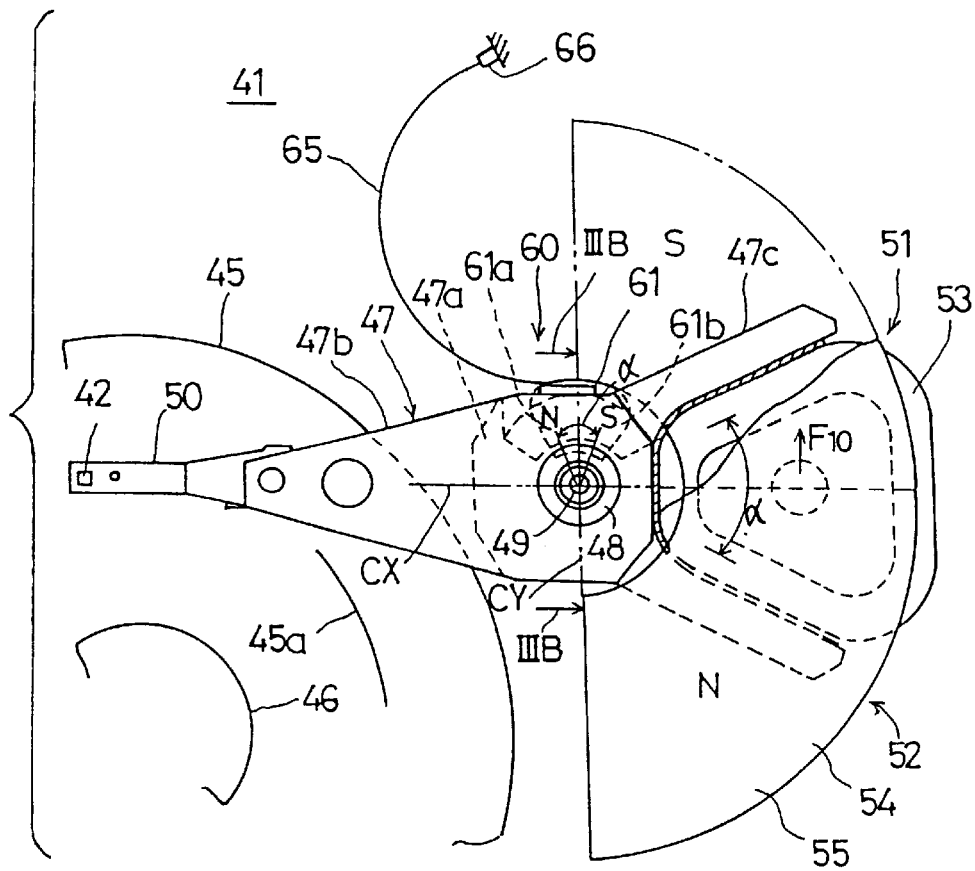
FIGS. 3A and 3B are diagrams showing a first magnetic head carriage assembly using the drive system of FIG. 1.
Figure 3B:
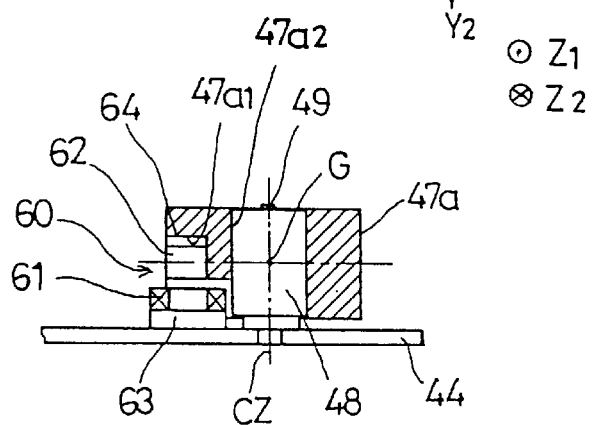

As shown in FIGS. 3A and 3B, the magnetic head carriage assembly 41 has an arm-shaped head carriage 47. The head carriage 47 comprises a hub portion 47a, an arm portion 47b extending from this hub portion 47a in an X2 direction, and a fork-shaped portion 47c extending from the hub portion 47a in an X1 direction. The ball bearing 48, as shown in FIG. 3(B), fixedly mounts the pivot 49 to the chassis base 44. The head carriage 47 fits the ball bearing 48 to a through-hole aperture 47a2 in the hub portion 47a, so that the axis 49 can rotate about a center.

CX is an axial line in a longer longitudinal direction of the head carriage 47, and passes through the pivot 49. CY passes through the pivot 49 and intersects with axial line CX. CZ is the axial line of the pivot 49. X1,X2 represents the axial line CX direction, Y1,Y2 represents the line CY direction and Z1,Z2 represents the axial line CZ direction, that is, height.

A head suspension 50 is mounted at the X2 end of the arm portion 47b, and a magnetic head slider 42 having a magnetic head on an end surface is fixedly mounted on the head suspension 50. When the head carriage 47 rotates the magnetic head slider 42 moves in the direction of a radius of the rotating magnetic disk 45.

A primary magnetic drive unit 51 that operates during seek mode is provided on the X1 side of the head carriage 47. The primary magnetic drive unit 51 is the first drive unit described in the claims, and comprises a magnetic circuit structure 52 fixedly mounted on a chassis base 44 and a flat, quadrilateral drive coil 53 fixedly mounted on the fork-shaped portion 47c. The magnetic circuit structure 52 comprises a permanent magnet 54 and a yoke 55 vertically opposing the drive coil 53. The permanent magnet 62 is plate-shaped, and arc-shaped, and divided at the center into two segments polarized into two polarities.

As shown in FIG. 3B in particular, reference number 60 is a secondary drive device, provided on line CY, positioned on the Y1 side of the pivot 49 and contacting the ball bearing 48. As shown in the plan view provided by FIG. 3A, the secondary drive device 60 is mounted in a region included within the hub portion 47a.

The secondary drive device 60 has a relatively small size compared to that of the primary magnetic drive unit 51 and operates during a tracking mode, and the drive power it generates is also small compared to that required by the seek mode. As a result, the secondary drive device 60 may be relatively small in size compared to the primary magnetic drive unit 51 and yet still be sufficient for its purpose. As a result, as described above, as shown in the plan view the secondary magnetic drive unit 60 is accommodated within a region included within the hub portion 47a.

The secondary magnetic disk drive 60 comprises opposed flat, quadrilateral drive coil 61 and permanent magnet 62, as well as yokes 63, 64. The flat drive coil 61 is fixedly mounted on top of yoke 63 and fixedly mounted on the chassis base 44. The permanent magnet is fixedly mounted at the bottom of yoke 64 and fixedly mounted within a concavity 47a1 on the bottom of the hub portion 47a. The permanent magnet 62 is plate-shaped, and arc-shaped, and divided at the center into two segments polarized into two polarities. The size of the flat drive coil 61 is such that an angle α formed by two sides 61a, 61b extending in radial directions through the pivot 49 is identical to an angle α formed by the corresponding sides of the drive coil 53, so as to ensure that the secondary magnetic drive unit 60 can operate normally regardless of the position of the head carriage 47.

The drive coil 61 of the secondary magnetic drive unit 60 is relatively small compared to the drive coil of the primary magnetic drive unit 51, and the torque constant of the secondary magnetic drive unit 60 is particularly small as compared to the torque constant of the primary magnetic drive unit 51.

Reference number 65 is a flexible cable, one end of which is drawn from the head carriage 47 hub portion 47a side in a curve and the other end of which is connected to a connector 66.

Next, a description will be given of the operation of the above-described magnetic disk drive 40, though without reference to a tracking operation.

Figure 5:
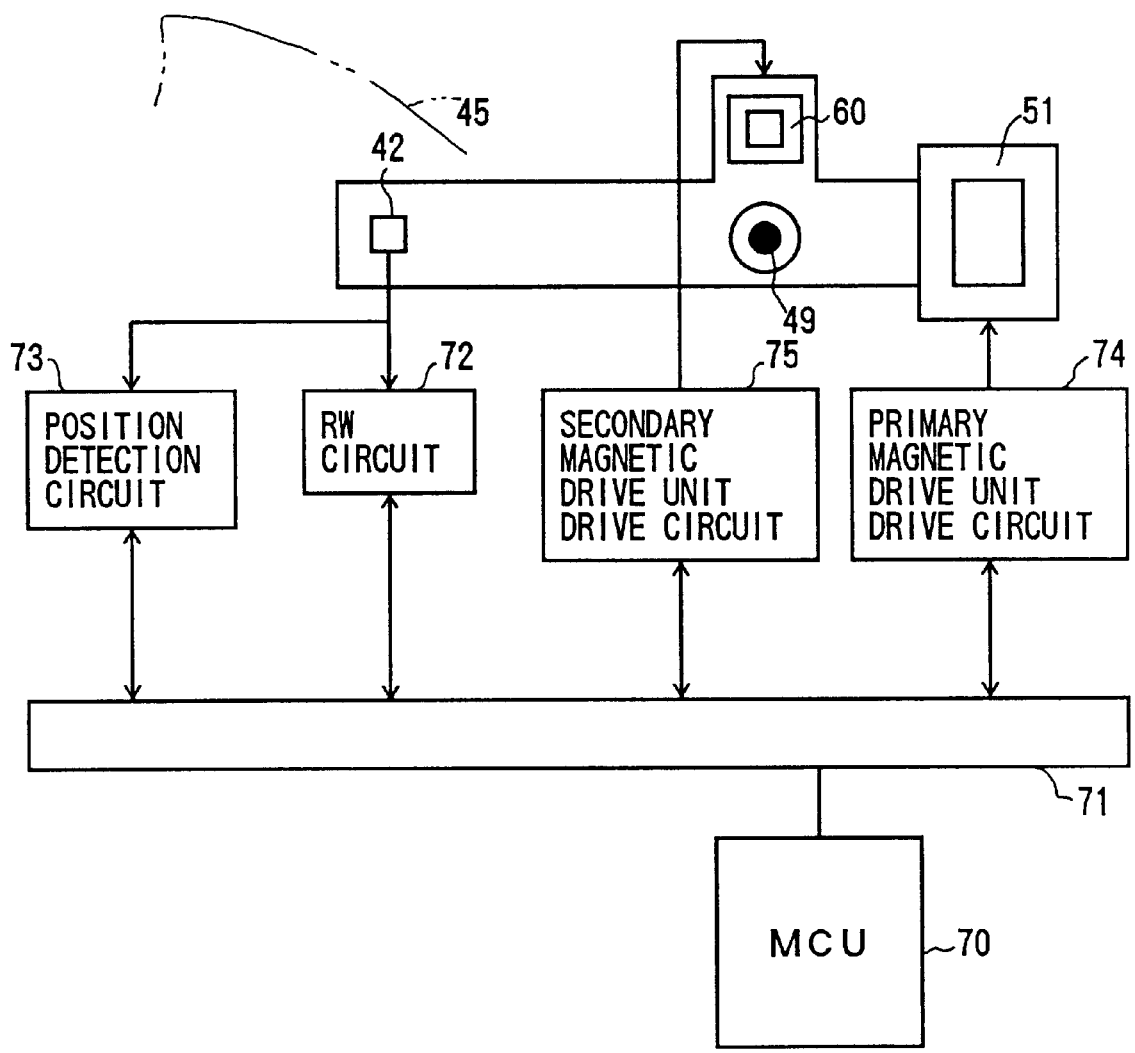
FIG. 5 is a block diagram of a circuit related to the magnetic head carriage assembly of FIGS. 3A and 3B.

During operation of the magnetic disk drive 40, the magnetic head carriage assembly 41 operates under the control of the micro-controller unit (MCU) 70 shown in FIG. 5, in which reference number 71 is a bus. During a read operation, information picked up from the rotating magnetic disk 45 by the magnetic head slider 42 is read by a read/write circuit 72. In a write operation, information output from the read/write circuit 72 is written to the magnetic disk 45 by the magnetic head slider 42. Additionally, a position detecting circuit 73 detects a track 45a of the magnetic disk 45 being traced by the magnetic head slider 42 from the information picked up from the rotating magnetic disk 45 by the magnetic head slider 42.

When a seek command issues from the MCU 70 a main magnetic drive device drive circuit 74 is activated, a drive current is supplied to the drive coil 53, the main magnetic drive device 51 is activated, the head carriage 47 is rotated and the magnetic head slider 42 is moved to a predetermined track. The main magnetic drive device 51 generates a large force F10 so as to pivot the head carriage 47 rapidly and so complete the seek within a short period of time.

Next, a description will be given of a second magnetic head carriage assembly 41C, depicted in FIGS. 7A and 7B. With the exception of the secondary magnetic drive unit 60C, this second magnetic head carriage assembly 41C is identical to the first magnetic head carriage assembly 41 described above.

The secondary magnetic drive unit 60C is provided at a position on line CX on the X2 side of the pivot 49, that is, on the magnetic head slider 42 side, adjacent to the bearing 48 and, as shown in the plan view, in a region included within the hub portion 47aC.

As shown in FIG. 7(B), the secondary magnetic drive unit 60C has a flat quadrilateral drive coil 61C that is vertically affixed to the chassis base 44 by a coil support 70 and positioned within an arc-shaped slit 47a1C formed on the hub portion 47aC, a permanent magnet 62C fixedly mounted on an outer peripheral surface of the ball bearing 48, and a yoke 63C fixedly mounted on a wall surface of the arc-shaped slit 47a1C.

Figure 8:
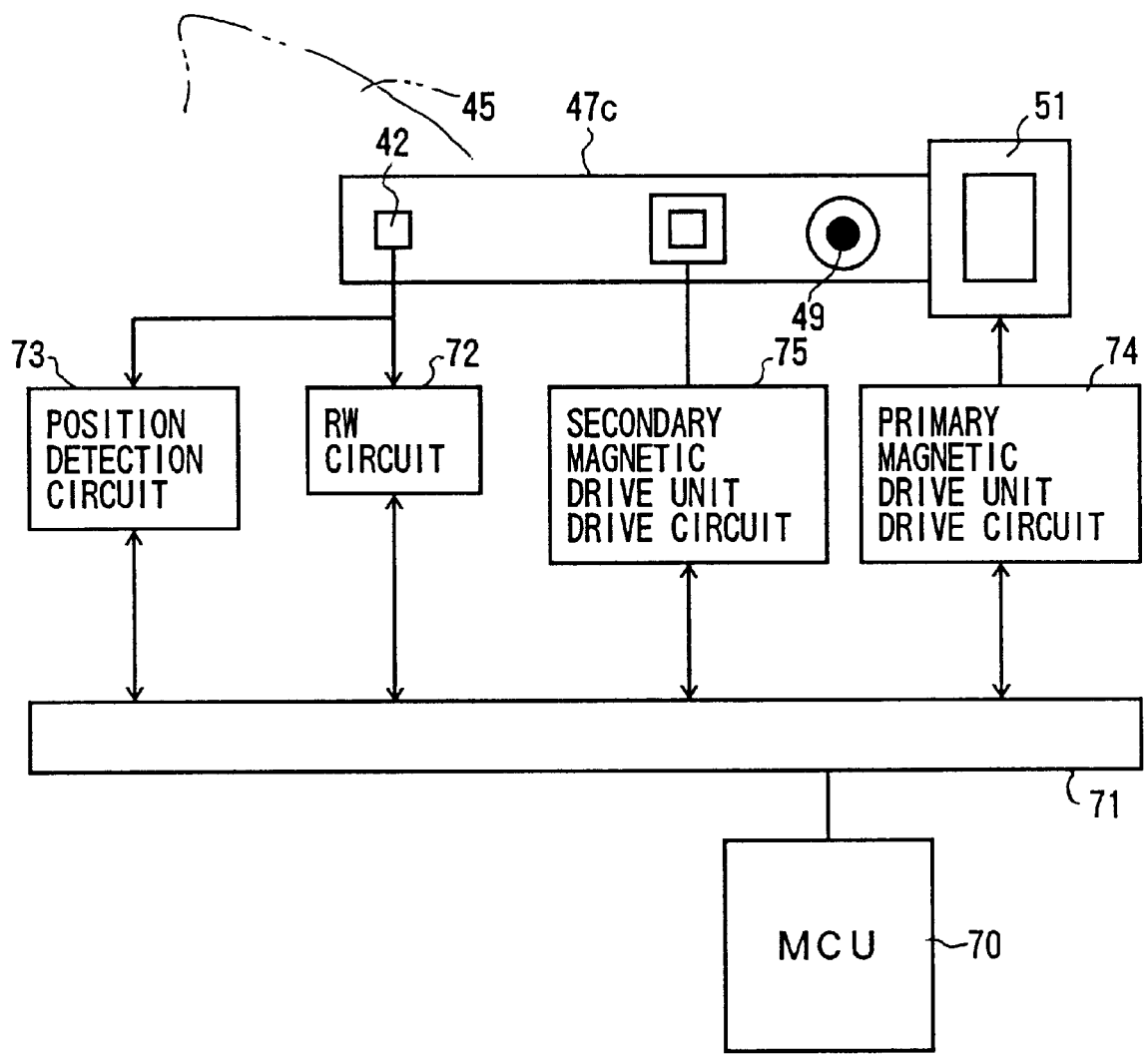
FIG. 8 is a block diagram of a circuit related to the magnetic head carriage assembly of FIG. 7.
Figure 9A:
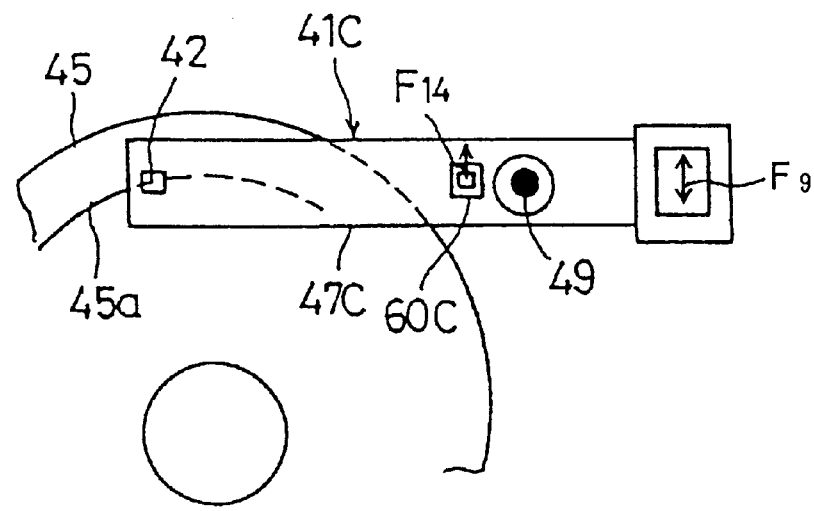
FIGS. 9A and 9B are diagrams explaining a tracking operation.
Figure 9B:
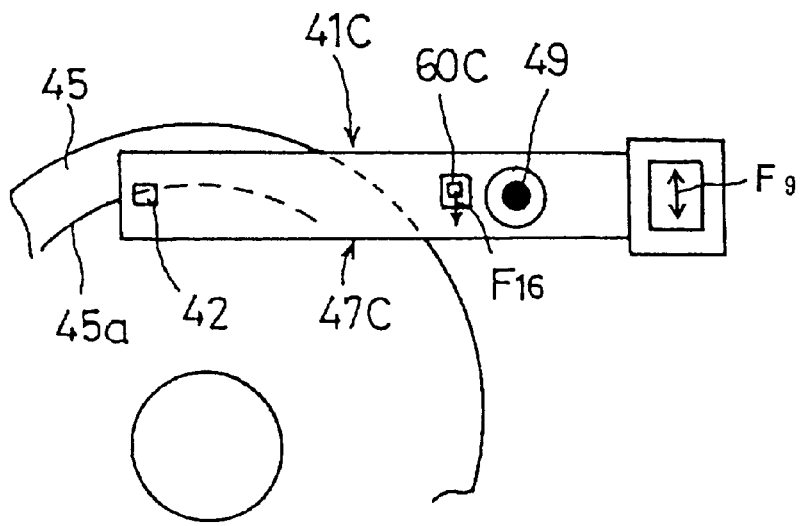

When a seek command issues from the MCU shown in FIG. 8, the main magnetic drive device drive circuit 74 is activated, a drive current is supplied to the drive coil 53, the main magnetic drive device 51 is activated, the head carriage 47C is rotated and the magnetic head slider 42 is moved to a predetermined track.

The above description pertains to the first and second magnetic head carriage assemblies and magnetic disk drive using the head carriage assembly drive system according to the first embodiment of the present invention.

Next, a description will be given of the head carriage drive system according to the first embodiment of the present invention, of which FIG. 1 is a block diagram for explaining the operation thereof.

Figure 2:
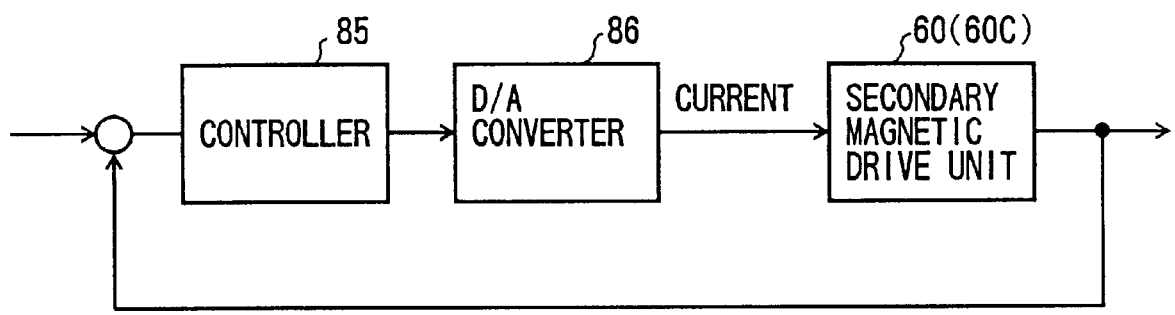
FIG. 2 is a block diagram of a unit for obtaining eccentricity information of the first control unit depicted in FIG. 1.

In FIG. 1, reference number 81 is a first control unit, with information concerning an eccentricity of the magnetic disk 45 of the magnetic disk drive 40, that is, an eccentricity of the track 45a, stored for example in the ROM. The information of the eccentricity of the magnetic disk 45 of the magnetic disk drive 40, that is, the eccentricity of the track 45a, is obtained in the manner described below by using the circuit structure comprising the controller 85 and the D/A converter 86 shown in FIG. 2 as well as the secondary magnetic drive unit 60.

Initially, a current value when a tracking operation is carried out using only the secondary magnetic drive unit 60 is obtained for an appropriate time period. Next, the current value so obtained is Fourier transformed to derive the eccentricity. Finally, the eccentricity thus obtained is multiplied by a constant k determined by the ratio of the torque constant of the primary magnetic drive unit 51 to the torque constant of the secondary magnetic drive unit 60. In this manner the magnetic disk 45 eccentricity, that is, the eccentricity of the track 45a, is obtained.

This eccentricity of the magnetic disk 45, that is, the eccentricity of the track 45a, is not necessarily constant, and therefore is sought periodically at appropriate time intervals and old information replaced with new information.

The first control unit 81 generates a low-frequency sine wave eccentricity compensation current a that is applied to the primary magnetic drive unit 51, thus causing the primary magnetic drive device 51 to generate torque to compensate for the eccentricity of the magnetic disk 45 of the magnetic disk drive 40, that is, the eccentricity of the track 45a.

Reference number 82 is the second control unit, which generates a position correction current b when supplied with a position error signal calculated by subtracting a signal indicating the actual position from the magnetic head slider 42 from a signal indicating the target position of the magnetic head slider 42. This position correction current b is used for correcting the position difference obtained by subtracting the compensated eccentricity of the magnetic disk 45, that is, the track 45a eccentricity, from the position differential with respect to the track 45a of the magnetic head slider 42, and has a high frequency. The position correction current b generated by the second control unit 82 is applied to the secondary magnetic drive unit 60, 60C.

The primary magnetic drive unit 51 is driven by the eccentricity correction current a, the secondary magnetic drive unit 60, 60C is driven by the position correction current b, the head carriage 47, 47C is driven by the primary magnetic drive unit 51 and the secondary magnetic drive unit 60, and the magnetic head slider 42 tracks the track 45a.

A description will now be given separately for the head carriage 47 shown in FIG. 3 and the head carriage 47C shown in FIG. 7, respectively.

First, a description will be given of the head carriage 47 shown in FIG. 3, in which the driving of the head carriage 47 by the primary magnetic drive unit 51 and the secondary magnetic drive unit 60 are considered separately.

Figure 6A:
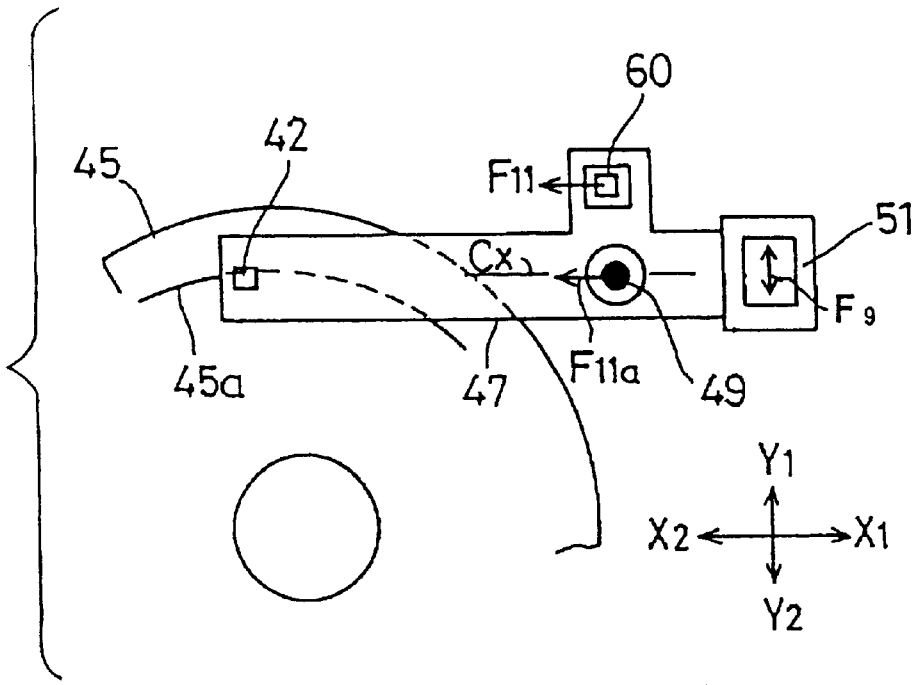
FIGS. 6A and 6B are diagrams explaining a tracking operation.
Figure 6B:
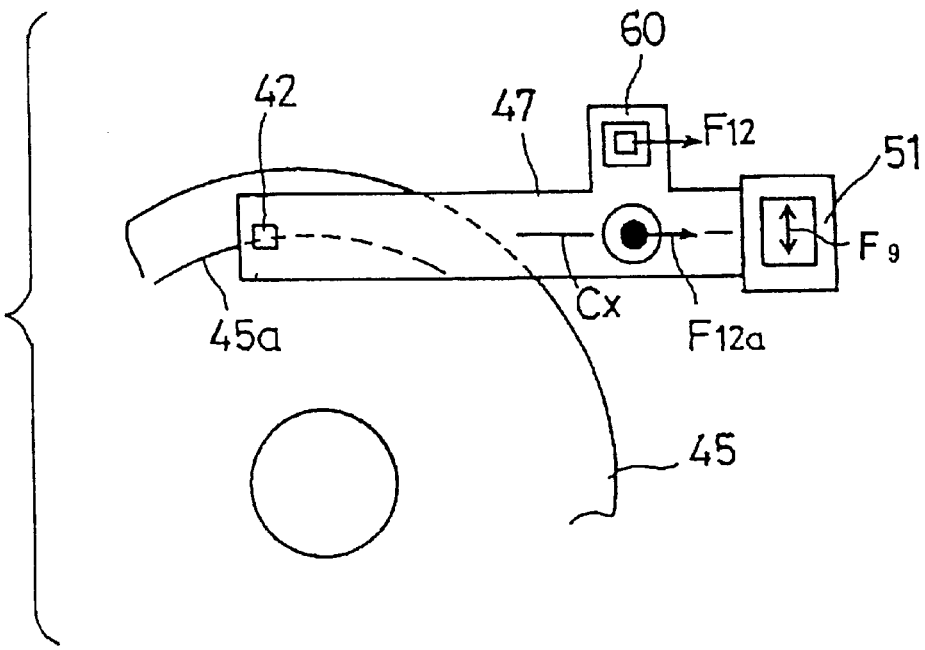

As shown in FIGS. 6A and 6B, the primary magnetic drive unit 51 generates a force F9. With the drive from this primary magnetic drive unit 51 the magnetic head slider 42 tracks the eccentricity of the magnetic disk 45 and compensates for the eccentricity of the magnetic disk 45. Additionally, the magnetic head slider 42 uses the drive from the secondary magnetic drive unit 60 to correct a position differential that could not be corrected by the action of the primary magnetic drive unit 51 alone.

As a result, the secondary magnetic drive unit 60, for which power consumption is great because the torque constant is small, is assigned to correct a positional differential which could not be corrected by the action of the primary magnetic drive unit 51 alone, the primary magnetic drive unit 51 having a large torque constant. As compared to the previously disclosed configuration, in which the secondary magnetic drive unit alone compensates for the overall position differential including the eccentricity of the disk 45, the above-described configuration results in a 10–20% reduction in power consumption.

It should be noted that the frequency of the drive generated by the primary magnetic drive unit 51 is the rotation frequency of the magnetic disk 45, that is, several hundred Hz. As a result, the lateral mode caused by the limited rigidity of the ball bearing 48 is not generated by the drive generated by the primary magnetic drive unit 51. Additionally, force F11 and force F12 generated by the secondary magnetic drive unit 60 are in the direction shown in FIGS. 6A and 6B. As a result, the track direction lateral is not generated. Therefore the servo bandwidth is increased, the magnetic head slider can be positioned with a high degree of accuracy with respect to the track and tracking can be done accurately.

Next, a description will be given of the head carriage 47C shown in FIG. 7, in which the driving of the head carriage 47 by the primary magnetic drive unit 51 and the secondary magnetic drive unit 60 are considered separately.

The primary magnetic drive device generates a force F9. With the drive from this primary magnetic drive unit 51 the magnetic head slider 42 compensates for the eccentricity of the magnetic disk 45. As a result, the secondary magnetic drive unit 60C, for which power consumption is great because the torque constant is small, supplements the primary magnetic drive unit 51, which has a large torque constant, so as to correct a positional differential which could not be corrected by the action of the primary magnetic drive unit 51 alone. As compared to the previously disclosed configuration, in which the secondary magnetic drive unit alone compensates for the overall position differential including the eccentricity of the disk 45, the above-described configuration results in a 10–20% reduction in power consumption.

It should be noted that, for the same reasons given earlier with respect to the head carriage 47, the magnetic head slider can be positioned with a high degree of accuracy with respect to the track and tracking can be done accurately.

Figure 10:
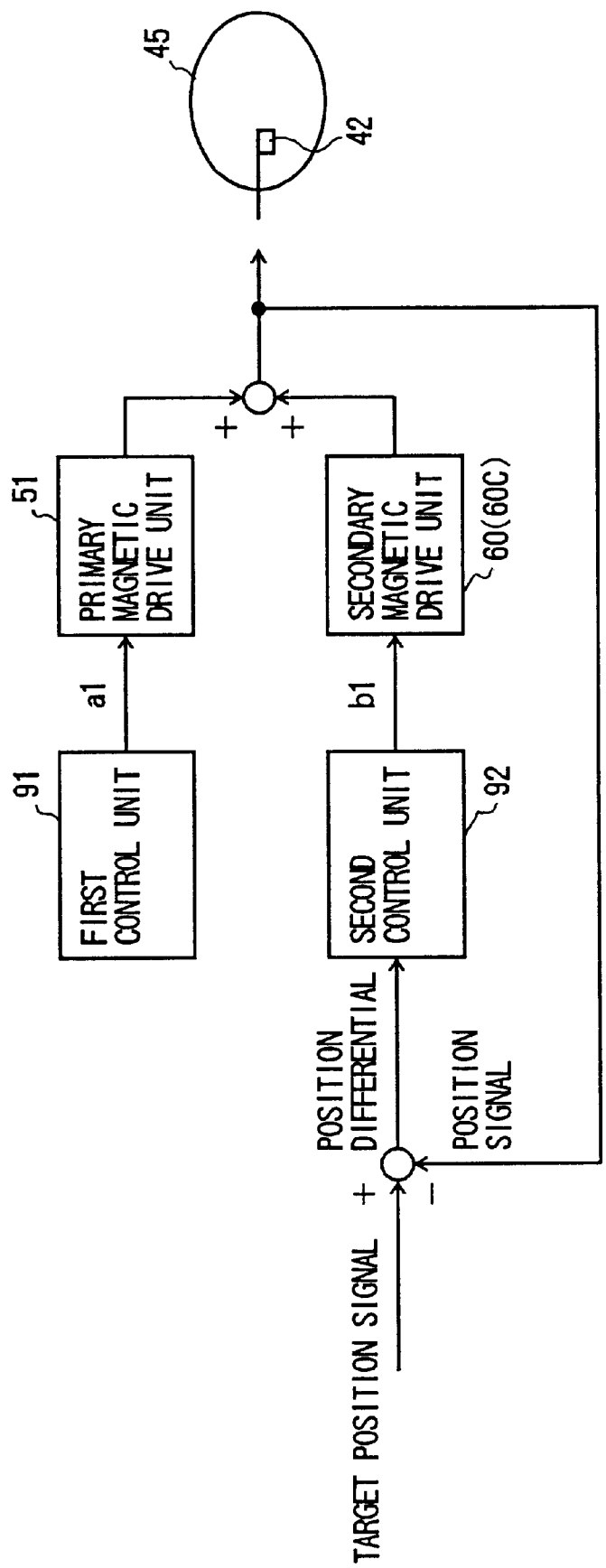
FIG. 10 is a block diagram for explaining a drive system of a first variation of a head carriage assembly according to the first embodiment of the present invention.

FIG. 10 is a block diagram for explaining a drive system of a first variation of a head carriage assembly according to the first embodiment of the present invention. In FIG. 10, reference number 91 is a first control unit, in which a bias rotation force that rotates this in a counterclockwise direction due to the elasticity of the flexible cable 65 is for example stored in a ROM. This bias rotation force is a DC component. This bias rotation force is obtained in the manner described below using the circuit structure shown in FIG. 2.

Initially, the current value during tracking using only the secondary magnetic drive unit 60 is averaged across all samples and this average value is then multiplied by the constant k described above, that is, the ratio of the torque constant of the primary magnetic drive unit 51 to the torque constant of the secondary magnetic drive unit 60, thus obtaining the current component to be applied to the primary magnetic drive unit 51.

It should be noted that the current component to be applied to the primary magnetic drive unit 51 changes depending on the track to be tracked. As a result, the current value during tracking using only the secondary magnetic drive unit 60 may be sampled at several tracks between the outer periphery and the inner periphery of the magnetic disk 45, kept as a table of current values with respect to each track, and the current value for tracks between sampled tracks approximated from the known sampled track values.

Additionally, the DC component applied to the primary magnetic drive unit 51 is not constant but is resought at appropriate time intervals, with the old information continually replaced with new information.

It should be noted that a bias rotation force caused by the elastic force of the flexible cable 65 and the airflow created by the high speed with which the magnetic disk 45 rotates acts on the head carriage 47, 47C to rotate the carriage 47, 47C.

In order to offset this bias rotation force the first control unit 91 generates a direct-current bias rotation force compensatory current a1 that is applied to the primary magnetic drive unit 51, thus causing the primary magnetic drive unit 51 to generate a torque exactly equal to the bias rotation force.

Reference number 92 is the second control unit, which generates a position correction current b1 when supplied with a position correction signal with respect to the magnetic head slider 42 target position obtained directly from the magnetic head slider 42 output. This position correction current b1 includes a high-frequency component. The position correction current b1 generated by the second control unit 92 is applied to the secondary magnetic drive unit 60, 60C.

During tracking, the primary magnetic drive unit 51 is driven by the drive signal a1 and the secondary magnetic drive unit 60, 60C is driven by the drive signal b1. The head carriage 47, 47C depicted in FIG. 3 and FIG. 7 is driven by the primary magnetic drive unit 51 and the secondary magnetic drive unit 60, 60C, and the magnetic head slider 42 tracks the track 45a.

In the magnetic head carriage assembly 41, 41C depicted in FIG. 3 and FIG. 7, the rotational force that offsets the bias rotation force caused by the elastic force of the flexible cable 65 is augmented by the primary magnetic drive unit 51 having a large torque constant, and thus the secondary magnetic drive unit 60, 60C may generate an amount of torque that is less than the amount of torque that the secondary magnetic drive unit 60 ordinarily generates, the difference being equal to the bias rotation force.

Accordingly, as compared to a case in which tracking is carried out using only the secondary magnetic drive unit 60, with the configuration described above the amount of electricity consumed when tracking is reduced by an amount equivalent to the amount by which the torque constant of the primary magnetic drive unit 51 exceeds the torque constant of the secondary magnetic drive unit 60.

Specifically, as compared to the configuration of the previously submitted application, in which position correction is accomplished using only the secondary magnetic drive unit 60, 60C, the amount of power consumed is reduced by 50% or more.

It should be noted that the invention depicted in the block diagram shown in FIG. 1 and the invention depicted in the block diagram shown in FIG. 10 may be combined. By combining these inventions the amount of current applied to the secondary magnetic drive unit 60, 60C can be further reduced, and accordingly, the amount of power consumed during tracking can be reduced by 50% or more.

Figure 11:
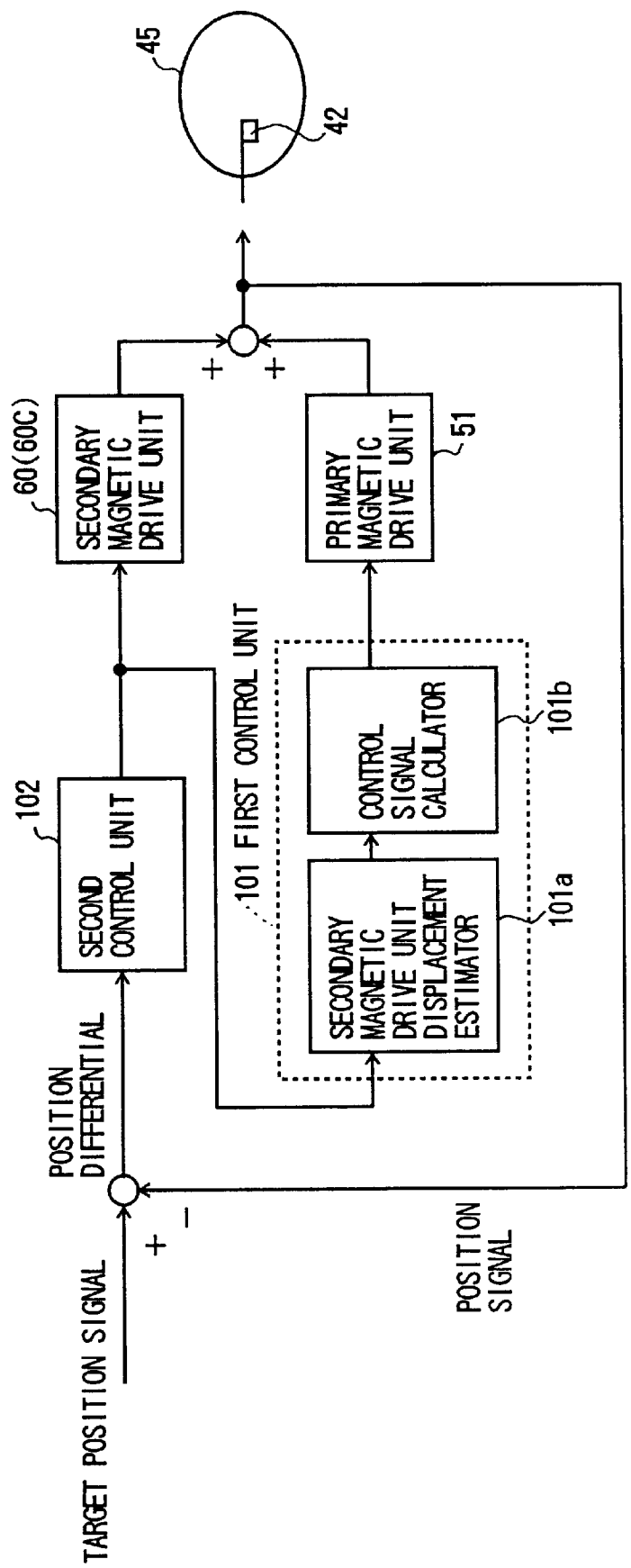
FIG. 11 is a block diagram for explaining a drive system of a second variation of a head carriage assembly according to a first embodiment of the present invention.

FIG. 11 is a block diagram for explaining a drive system of a second variation of a head carriage assembly according to a first embodiment of the present invention. As can be appreciated from the drawing, a position error signal is input into the second control unit 102 and the second control unit 102 outputs a control signal for controlling the tracking.

The first control unit 101 is provided so that the output of the second control unit 102 is input, and comprises a secondary magnetic drive unit displacement estimator 101a for calculating the displacement of the secondary magnetic drive unit 60, 60C and a control signal calculator 101b for calculating the input to the primary magnetic drive unit 51. The secondary magnetic drive unit displacement estimator 101a is a filter modeling the position displacement transfer function for the secondary magnetic drive unit 60, 60C input. This partial position error signal is input to the second control unit 102 and the second control signal 102 outputs a control signal for controlling the tracking.

The primary magnetic drive unit 51 takes the displacement of the secondary magnetic drive unit 60 as the target value, and, accordingly, the circuit block depicted in FIG. 11 operates to reduce the current flowing to the secondary magnetic drive unit 60, 60C to zero. The result is that, the primary magnetic drive unit 51 drives the magnetic head slider 42 along the track 45a in the low-frequency bands and the secondary magnetic drive unit 60 drives the magnetic head slider 42 along the track 45a in the high-frequency bands.

As a result, the secondary magnetic drive unit 60, 60C consumes less power than when tracking is accomplished using the secondary magnetic drive unit 60, 60C alone, and accordingly, the entire tracking operation consumes less power.

Specifically, as compared to the configuration of the previously submitted application, in which position correction is accomplished using only the secondary magnetic drive unit 60, 60C, the amount of power consumed is reduced by 50% or more.

It should be noted that a filter that has a high gain at rotational frequency may be provided on the first control unit 101 as a means of compensating for the eccentricity of the disk 45. In that case, the drive of the primary magnetic drive unit 51 more effectively corrects the eccentricity of the magnetic disk 45, that is, the magnetic head slider 42 accurately tracks the eccentricity of the track 45a of the magnetic disk 45.

Figure 12:
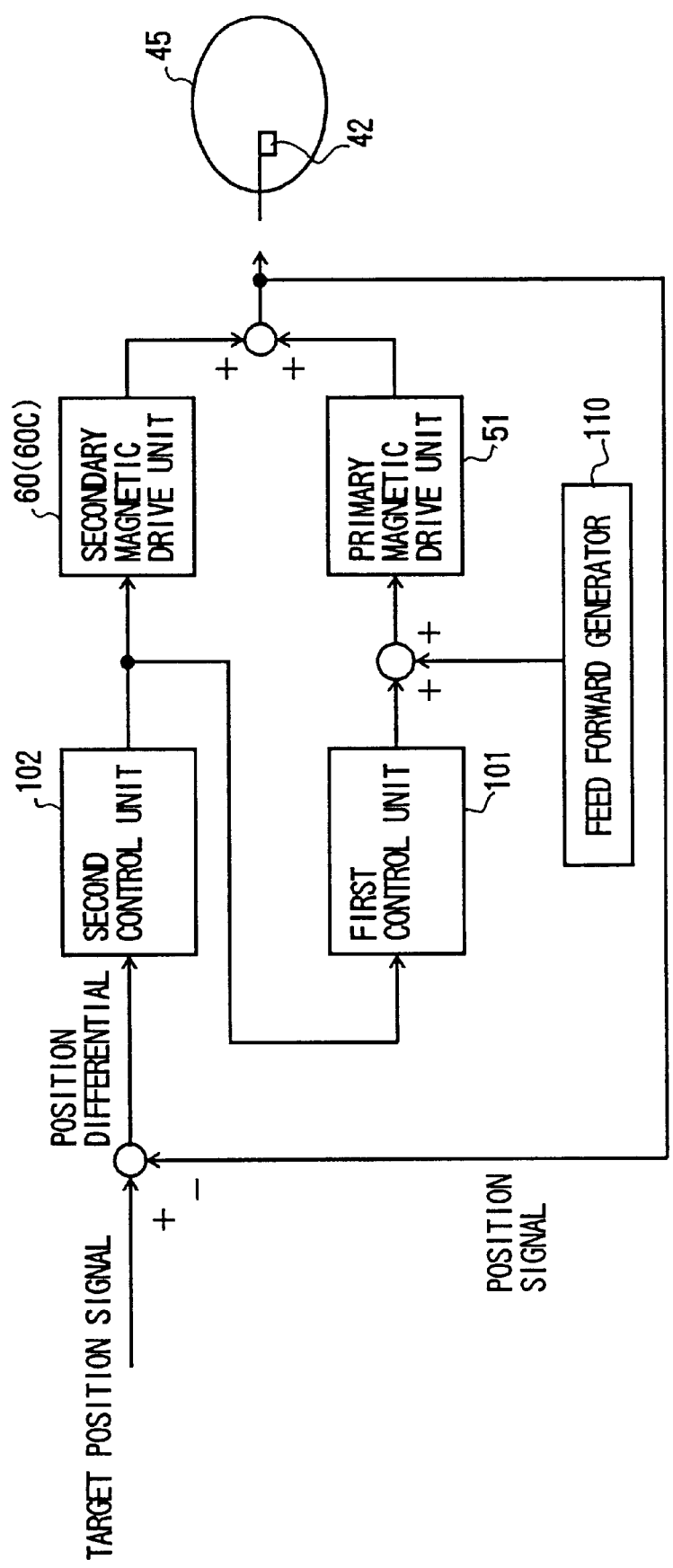
FIG. 12 is a block diagram for explaining a drive system of a third variation of a head carriage assembly according to a first embodiment of the present invention.

FIG. 12 is a block diagram for explaining a drive system of a third variation of a head carriage assembly according to a first embodiment of the present invention. The block diagram depicted in FIG. 12 is one in which a feed forward generator 110 has been added to the block diagram depicted in FIG. 11. The feed forward generator 110 has a memory. Information on the current for correcting the eccentricity of the magnetic disk as well as information on the current for offsetting the rotational force caused by the elastic force of the flexible cable 65 are stored in the memory. The feed forward generator 110 reads out this information when activating the primary magnetic drive unit 51.

During tracking, the output of the feed forward generator 110 is added to the output of the first control unit and supplied to the primary magnetic drive unit 51. As a result, during tracking the rotational force caused by the eccentricity of the magnetic disk and the elastic force of the flexible cable 65 is corrected mainly by the primary magnetic drive unit 51. As a result, the power consumption of the secondary magnetic drive unit 60, 60C having a small torque constant can be minimal, thus reducing power consumption during tracking by 50% or more.

Figure 13:
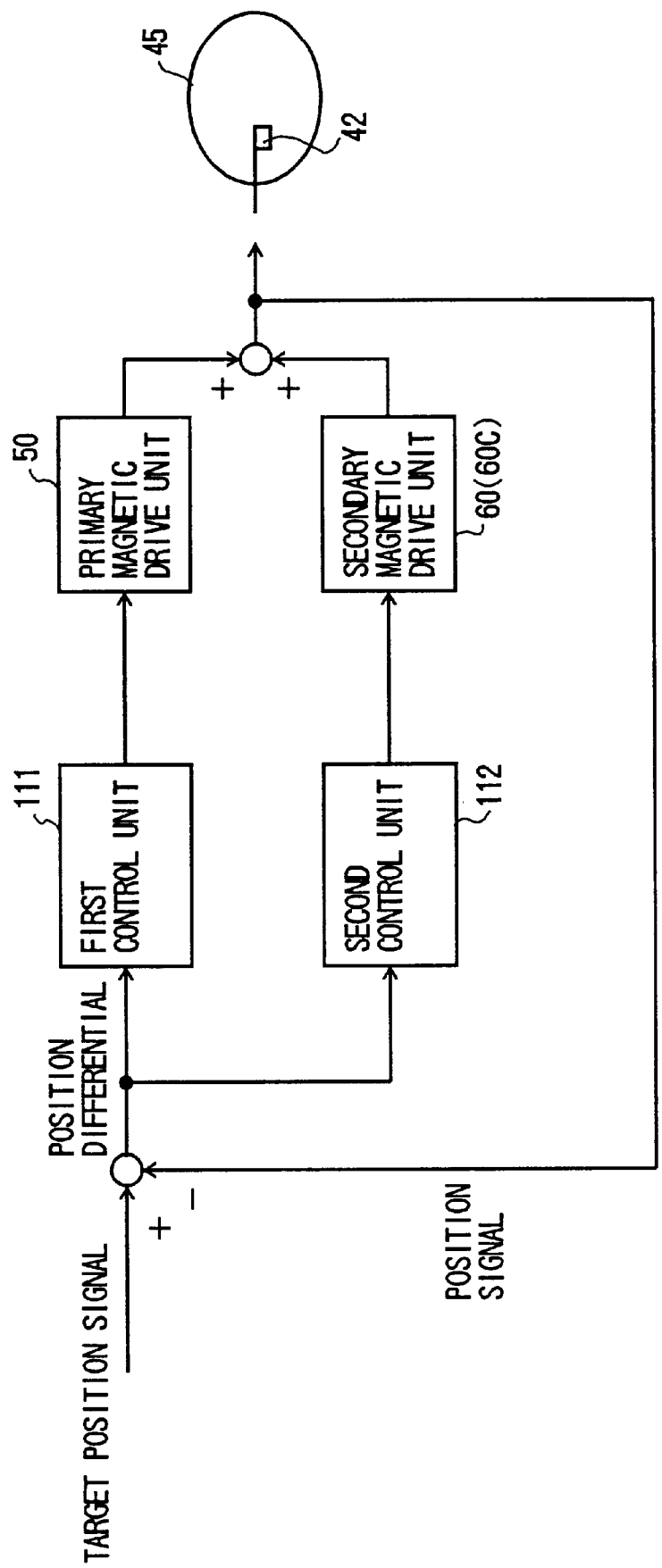
FIG. 13 is a block diagram for explaining a drive system of a fourth variation of a head carriage assembly according to a first embodiment of the present invention.

FIG. 13 is a block diagram for explaining a drive system of a fourth variation of a head carriage assembly according to a first embodiment of the present invention. As can be appreciated from the diagram, a position error signal is input to a first control unit 111 and a second control unit 112. The first control unit 111 and the second control unit 112 can be designed without regard to the displacement of either the primary magnetic drive unit 51 or the secondary magnetic drive unit 60, 60C, and is of simple structure. Power consumption during tracking is reduced.

It should be noted that the feed forward generator 110 depicted in FIG. 12 may be added to the variation described above and depicted in FIG. 13.

A description will now be given of a head carriage assembly drive system according to a second embodiment of the present invention. For convenience, a description will be given of a magnetic head carriage assembly employing the head carriage assembly drive system according to this second embodiment of the present invention.

The drive system according to this second embodiment is the magnetic head carriage assembly 41 depicted in FIGS. 3A and 3B and FIG. 5 and the magnetic head carriage assembly 41(C) depicted in FIGS. 7A and 7B and FIG. 8, and is employed when performing a seek operation using the primary magnetic drive unit 51.

Figure 14:
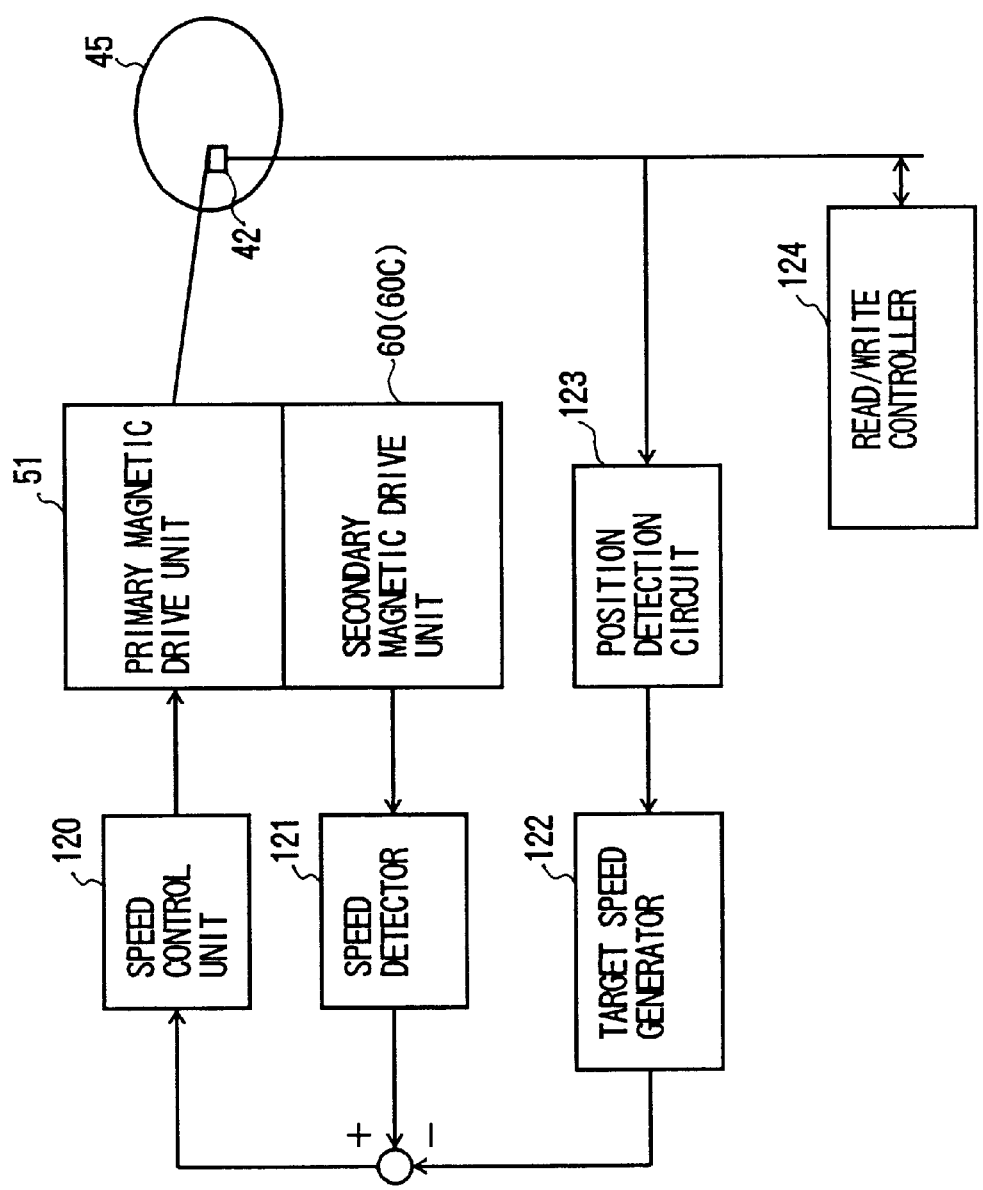
FIG. 14 is a block diagram for explaining a drive system of a head carriage assembly according to a second embodiment of the present invention.

FIG. 14 is a block diagram for explaining a drive system of a head carriage assembly according to a second embodiment of the present invention. The seek operation is conducted by controlling the speed of movement of the head slider 42. Based on the information retrieved by the head slider 42, the position detection circuit 123 detects the position of the head slider 42, and based on the position information from the position detection circuit 123 the target speed generator 122 outputs a target speed signal, that is, a signal of the speed at which the head slider 42 should move in order to seek smoothly the seek target track based on the relation between the current position of the head slider 42 and the seek target track.

Additionally, the secondary magnetic drive unit 60, 60C generates a voltage proportional to the speed of movement of the head slider 42 by moving a coil within a magnetic field. That is, the secondary magnetic drive unit 60, 60C functions as a head slider 42 speed sensor. The voltage generated by the secondary magnetic drive unit 60, 60C is supplied to the speed detector 121, which then outputs a speed signal.

A target speed signal generated by the target speed generator 122 is subtracted from the speed signal generated by the speed detector 121 and the resulting signal is supplied to the speed control unit 120. The speed control signal generated from the speed control unit 120 activates the primary magnetic drive unit 51 which then operates to bring the speed of the head slider 42 nearer to the target speed, thus causing the head slider 42 to seek the target track at the target speed.

Conventionally, time information and position information gotten from the head slider 42 have been supplied to a DSP, the DSP activated, calculations performed and the head slider speed thereby obtained. The operation of activating the DSP and performing the calculations and thereby obtaining the speed of the head slider 42 has been performed at certain intervals. Accordingly, the head slider 42 speed information has been intermittent instead of continuous. Additionally, the calculated speed has often been very different from the actual speed. As a result, the smoothness with which the head slider 42 should seek the target track has not always been obtained.

By contrast, the present invention provides continuous head slider 42 speed information and a voltage proportionate to the speed is obtained directly. Accordingly, the head slider 42 seeks the target track more consistently smoothly than has been the case conventionally.

Additionally, the need for DSP calculations is eliminated, and thus the load on the servo system decreased thereby. For this reason, too, the head slider 42 seeks the target track more consistently smoothly than has been the case conventionally.

Additionally, it should be noted that reference number 124 in FIG. 14 is a read/write controller.

A description will now be given of a first variation of a head carriage assembly drive system according to a second embodiment of the present invention.

The drive system according to this second embodiment is the magnetic head carriage assembly 41 depicted in FIGS. 3A and 3B and FIG. 5 and the magnetic head carriage assembly 41(C) depicted in FIGS. 7A and 7B and FIG. 8, and is employed when performing a tracking operation using the secondary magnetic drive unit 60, 60C.

Figure 15:
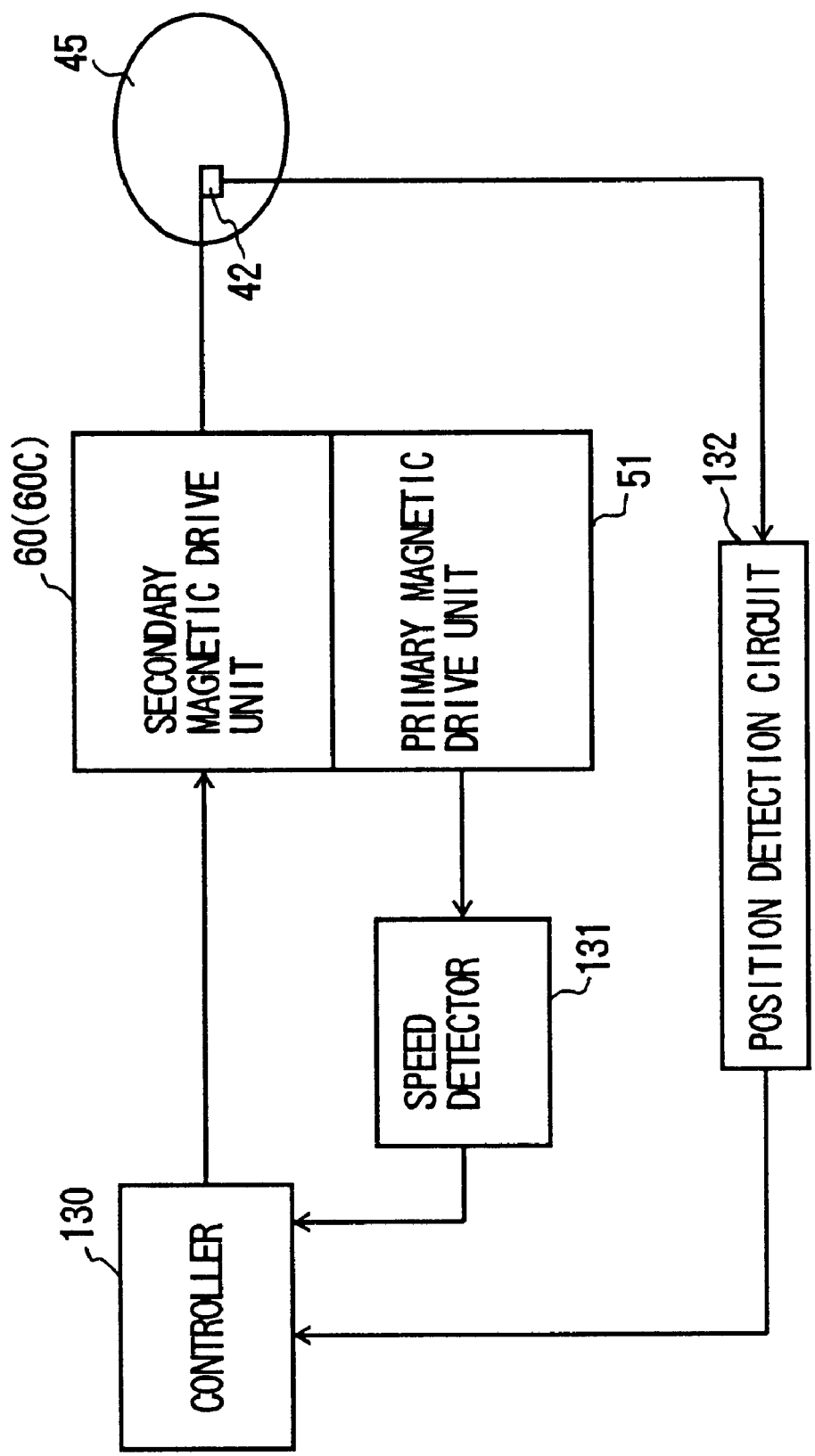
FIG. 15 is a block diagram for explaining a drive system of a first variation of a head carriage assembly according to a second embodiment of the present invention.

FIG. 15 is a block diagram for explaining a drive system of this first variation of a head carriage assembly according to this second embodiment of the present invention.

The tracking operation is performed by activating the secondary magnetic drive unit 60, 60C in accordance with a signal from the controller 130. The primary magnetic drive unit 51 generates a voltage proportional to the speed of movement of the head slider by moving a coil within a magnetic field. That is, the primary magnetic drive unit 51 functions as a head slider 42 speed sensor. The voltage from the primary magnetic drive unit 51 is supplied to the speed detector 131 and a speed signal output from the speed detector 131.

The information acquired by the head slider 42 is supplied to the position detection circuit 132 and the position detection circuit 132 outputs position information.

The speed signal from the speed detector 131 and the position information from the position detection circuit 132 are fed back to the controller 130.

Conventionally, an observer was used in order to obtain the speed signal, with the observer estimating the speed of the head slider 42 from calculations based on the value of the current to the secondary magnetic drive unit 60, 60C and the position information from the position detection circuit 132. In the present invention the need for an estimator for velocity is eliminated, so the calculations performed by the estimator are also eliminated. Accordingly, according to the present embodiment the load on the servo system is reduced as compared to the conventional arrangement and highly accurate tracking can be achieved. Additionally, the speed can be obtained directly, making for a more robust servo system.

A description will now be given of a head carriage assembly drive system according to a third embodiment of the present invention. For convenience, a description will be given of a magnetic head carriage assembly employing the head carriage assembly drive system according to this third embodiment of the present invention.

Figure 17A:
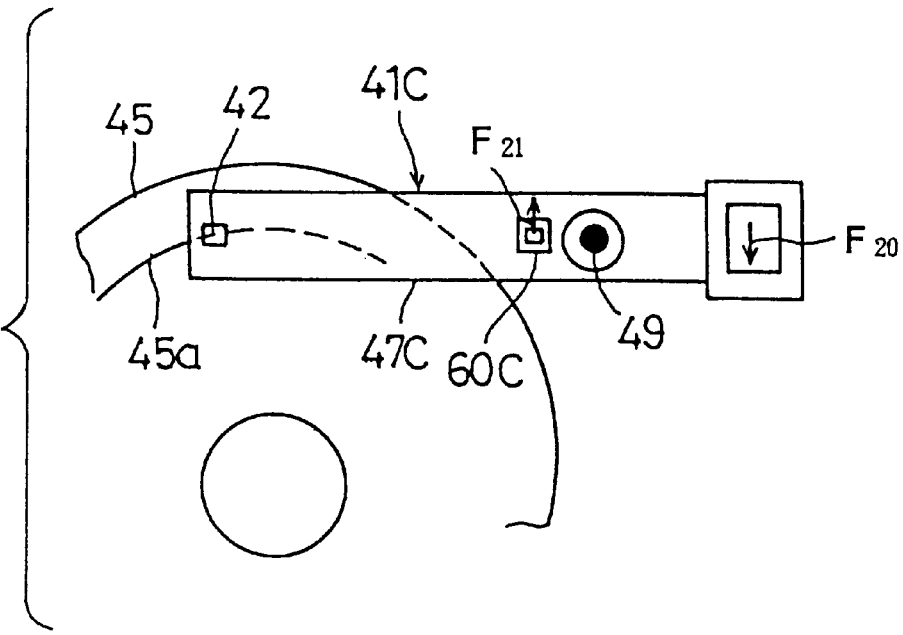
FIGS. 17A and 17B are diagrams explaining a tracking operation of a magnetic head carriage assembly using the drive system of FIG. 16.
Figure 17B:
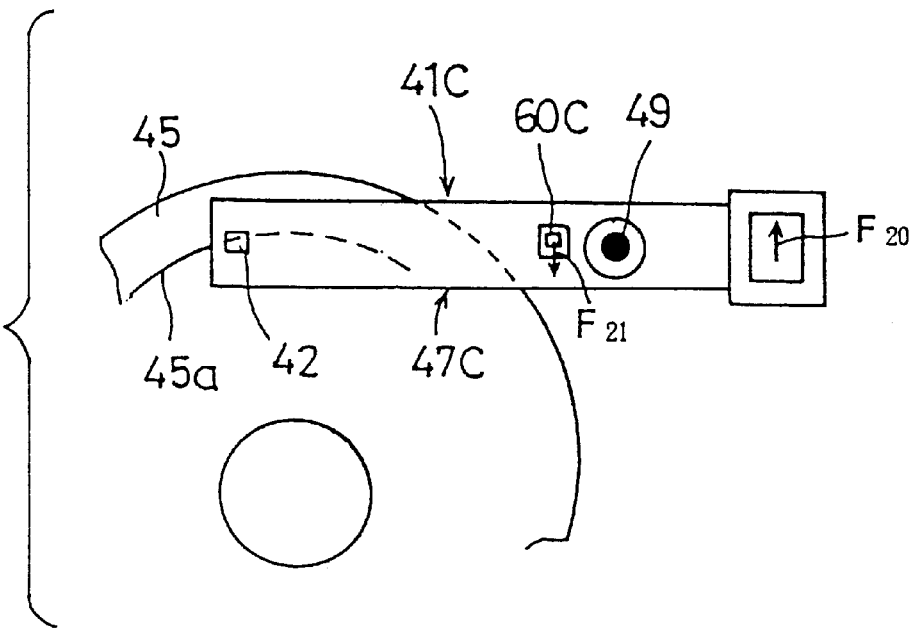

The drive system according to this second embodiment is the magnetic head carriage assembly 41(C) depicted in FIGS. 7A and 7B and FIG. 8, and is employed when performing a tracking operation by having the primary magnetic drive unit 51 and the secondary magnetic drive unit 60C generate forces in mutually opposed directions as shown in FIGS. 17A and 17B.

The force constant of the primary magnetic drive unit 51 is KT1. The force constant of the secondary magnetic drive unit 60C is KT2, and is considerably smaller than the force constant KT1 of the primary magnetic drive unit 51. The force constant is expressed as a ratio of applied current to generated force.

Figure 16:
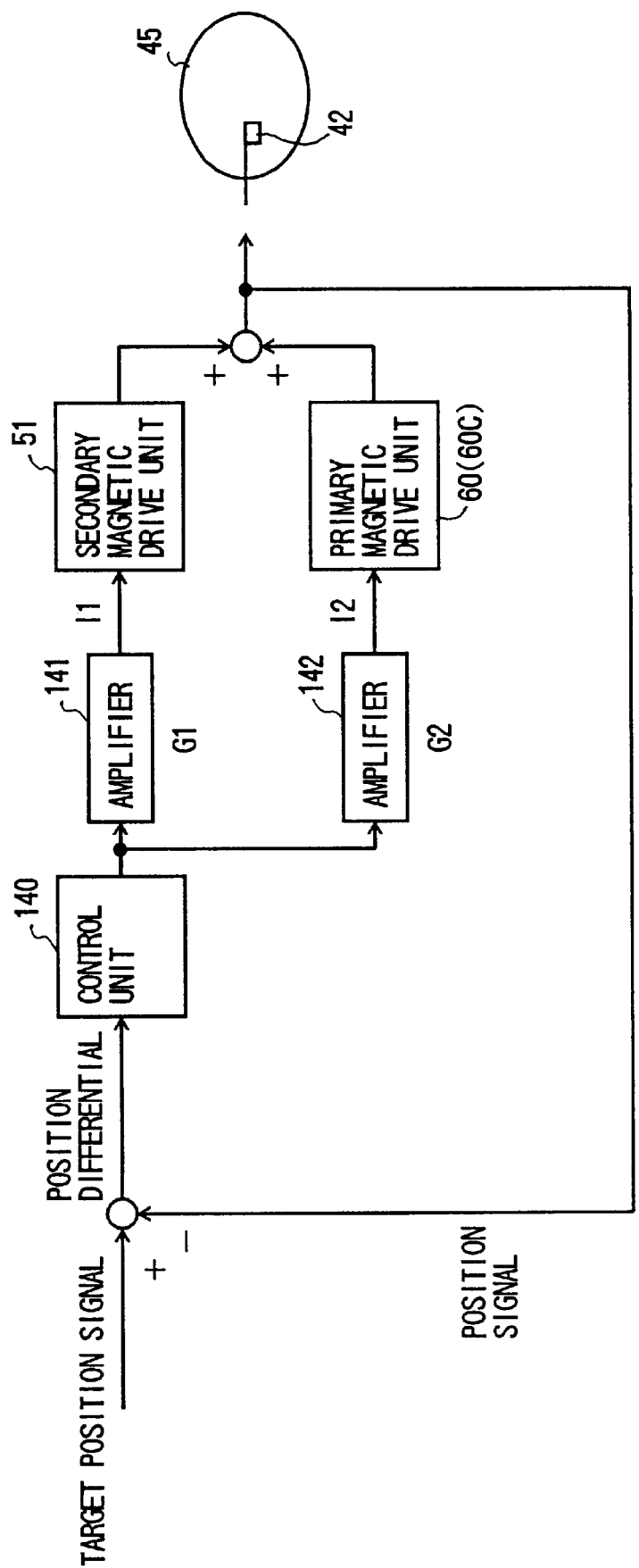
FIG. 16 is a block diagram for explaining a drive system of a head carriage assembly according to a third embodiment of the present invention.

FIG. 16 is a block diagram for explaining a drive system of a head carriage assembly according to this third embodiment of the present invention.

A gain G1 amplifier 141 is provided prior to the primary magnetic drive unit 51 and a gain G2 amplifier 142 is provided prior to the secondary magnetic drive unit 60C. Gain G1 and gain G2 are set so as to satisfy the equation G1:G2=KT2:KT1.

During operation, a position error signal that represents the difference between a target position signal and a position signal is applied to the control unit 140, and the control unit 140 outputs a drive current for tracking. This drive current is in one direction amplified by amplifier 141 to become drive current I1, which drive current I1 is supplied to the primary magnetic drive unit 51, and in another direction amplified by amplifier 142 to become drive current I2, which drive current I2 is supplied to the secondary magnetic drive unit 60C. Here, I1 and I2 represent current values.

The primary magnetic drive unit 51 is driven by drive current I1 and generates force F20. The secondary magnetic drive unit 60C is driven by drive current I2 and generates force F21. Force F20 is expressed as KT1×I1. Force F21 is expressed as KT2×I2. As indicated in FIGS. 17A and 17B, force F20 and force F21 are in opposed directions.

It should be noted that drive currents I1 and I2 are in the relationship of I1:I2=G1:G2. That is, drive currents I1 and I2 are in inverse proportion to primary magnetic drive unit 51 force constant KT1 and secondary magnetic drive unit 60C force constant KT2. Accordingly, force F20 and force F21 are of equal size. Accordingly, as depicted also in FIGS. 17A and 17B as well, the lateral force acting on the pivot 49 is cancelled out and only the torque of the periphery of the pivot 49 acts on the head carriage 47C. Accordingly, the lateral mode arising from the rigidity of the ball bearing is not excited and the servo bandwidth is increased, head slider 42 positioning accuracy is increased and tracking accuracy improved.

A description will now be given of a variation of the head carriage assembly drive system according to this third embodiment of the present invention.

Figure 18:
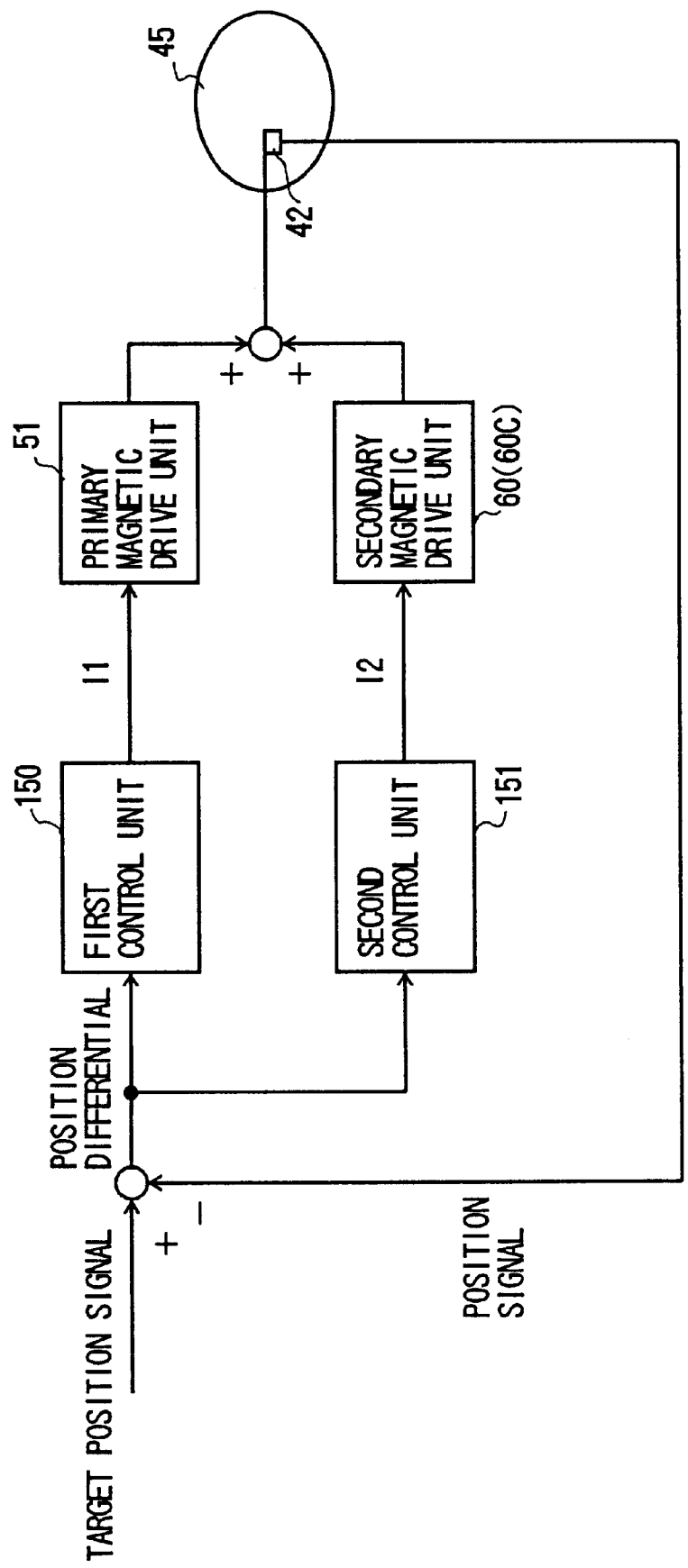
FIG. 18 is a block diagram for explaining a drive system of a first variation of a head carriage assembly according to a third embodiment of the present invention.

FIG. 18 is a block diagram for explaining a drive system of this first variation of a head carriage assembly according to this third embodiment of the present invention. A first control unit 150 is provided prior to the primary magnetic drive unit 51 and a second control unit 151 is provided prior to the secondary magnetic drive unit 60C.

A position error signal, representing the difference between the target position signal and the position signal, is applied to the first control unit 150 and the second control unit 151. The first control unit 150 outputs the drive current I1 noted previously and the second control unit 151 outputs the drive current I2 noted previously. The primary magnetic drive unit 51 is driven by the drive current I1 and generates a force F20, and the secondary magnetic drive unit 60C is driven by the drive current I2 and generates a force F21.

Accordingly, the lateral force acting on the pivot 49 is extinguished, the drive force becomes pure torque, head slider 42 positioning accuracy is improved and tracking is conducted with greater accuracy.

The above operation may be limited to the vicinity of the frequency generated by the lateral mode arising from the rigidity of the ball bearing.

It should be noted that, in each of the above-described embodiments, instead of the magnetic head slider, it is possible to mount an optical head slider having an optical head integrated into the slider. Accordingly, the present invention can be implemented in devices such as a suspension for an optical head slider, an optical head slider supporting device and an optical disk drive.

The above description is provided in order to enable any person skilled in the art to make and use the invention and sets forth the best mode contemplated by the inventor of carrying out the invention.

The present invention is not limited to the specifically disclosed embodiments and variations, and modifications may be made without departing from the scope of the present invention.

The present application is based on Japanese priority application No. 11-31745 filed on Feb. 2, 1999, the entire contents of which are hereby incorporated by reference.

What is claimed is:

1. A head carriage assembly drive system for driving a head carriage assembly during a tracking/seek operation, the head carriage assembly drive system comprising:

a first drive unit for generating force to rotate a head carriage of the head carriage assembly, the first drive unit being provided, with respect to a pivot, on a side of the head carriage opposite a side on which a head is provided;

a second drive unit positioned at a position other than a position at which the first drive unit is positioned, the second drive unit having a torque smaller than a torque of the first drive unit; and a control unit assigning mainly the first drive unit to operate in a low-frequency band and mainly the second drive unit to operate in a high-frequency band.

2. A head carriage assembly drive system for driving a head carriage assembly during a tracking/seek operation, the head carriage assembly drive system comprising:

a first drive unit for generating force to rotate a head carriage of the head carriage assembly, the first drive unit being provided, with respect to a pivot, on a side of the head carriage opposite a side on which a head is provided;

a second drive unit positioned at a position other than a position at which the first drive unit is positioned, the second drive unit having a torque smaller than a torque of the first drive unit; and a control unit assigning the first drive unit to operate with respect to an eccentricity of the disk track and the second drive unit to operate with respect to other than an eccentricity of the disk track.

3. A head carriage assembly drive system for driving a head carriage assembly during a tracking/seek operation, the head carriage assembly drive system comprising:

a first drive unit for generating force to rotate a head carriage of the head carriage assembly, the first drive unit being provided, with respect to a pivot, on a side of the head carriage opposite a side on which a head is provided;

a second drive unit positioned at a position other than a position at which the first drive unit is positioned, the second drive unit having a torque smaller than a torque of the first drive unit; and a control unit assigning the first drive unit to operate so as to supply a rotational force sufficient to offset a bias rotational force acting on the head carriage assembly, the second drive unit being driven to make the head follow the track on the disk.

4. A head carriage assembly drive system for driving a head carriage assembly during a tracking/seek operation, the head carriage assembly drive system comprising:

a first drive unit for generating force to rotate a head carriage of the head carriage assembly, the first drive unit being provided, with respect to a pivot, on a side of the head carriage opposite a side on which a head is provided;

a second drive unit positioned at a position other than a position at which the first drive unit is positioned, the second drive unit having a torque smaller than a torque of the first drive unit; and a control unit assigning the first drive unit to detect a speed of movement of the head and assigned only the second drive unit to drive the head.

5. A head carriage assembly drive system for driving a head carriage assembly during a tracking operation, the head carriage assembly drive system comprising:

a first drive unit for generating force to rotate a head carriage of the head carriage assembly, the first drive unit being provided, with respect to a pivot, on a side of the head carriage opposite a side on which a head is provided;

a second drive unit positioned, with respect to the pivot, on a side opposite the first drive unit, the second drive unit having a torque smaller than a torque of the first drive unit and generating a force that is the reverse of a force generated by the first drive unit; and a first drive unit current sent to the first drive unit and a second drive unit current sent to the second drive unit, the values of the first and second drive unit currents being substantially inversely proportional to the torques of the first and second drive units.

6. A head carriage assembly drive system for driving a head carriage assembly during a tracking/seek operation, the head carriage assembly drive system comprising:

a first drive unit for generating force to rotate a head carriage of the head carriage assembly, the first drive unit being provided, with respect to a pivot, on a side of the head carriage opposite a side on which a head is provided;

a second drive unit having a torque smaller than a torque of the first drive unit; and a control unit assigning the second drive unit to detect a speed of movement of the head and assigning only the first drive unit to drive the head.

7. A disk drive comprising:

a head;

a head carriage rotatably supported by a pivot for moving the head in a radial direction of a rotating disk;

a first drive unit for generating force to rotate the head carriage, the first drive unit being provided, with respect to the pivot, on a side of the head carriage opposite a side on which the head is provided;

a second drive unit positioned at a position other than a position at which the first drive unit is positioned, the second drive unit having a torque smaller than a torque of the first drive unit; and a control unit assigning the first drive unit to detect a speed of movement of the head and assigning only the second drive unit to drive the head.

8. A disk drive comprising:

a head;

a head carriage rotatably supported by a pivot for moving the head in a radial direction of a rotating disk;

a first drive unit for generating force to rotate the head carriage, the first drive unit being provided, with respect to the pivot, on a side of the head carriage opposite a side on which the head is provided;

a second drive unit having a torque smaller than a torque of the first drive unit; and a control unit assigning the second drive unit to detect a speed of movement of the head and assigning only the first drive unit to drive the head.

* * * * *

UNITED STATES PATENT AND TRADEMARK OFFICE
CERTIFICATE OF CORRECTION

PATENT NO.   : 6,671,120 B2                                               Page 1 of 1
DATED        : December 30, 2003
INVENTOR(S)  : Shinji Koganezawa It is certified that error appears in the above-identified patent and that said Letters Patent is hereby corrected as shown below:

<u>Column 14,</u>
Lines 34, 49 and 66, delete "tracking/seek" and insert -- tracking -- therefor.

<u>Column 15,</u>
Line 16, delete "tracking/seek" and insert -- tracking -- therefor.

<u>Column 16,</u>
Line 4, delete "tracking/seek" and insert -- tracking -- therefor.

Signed and Sealed this

Eighth Day of June, 2004

JON W. DUDAS
*Acting Director of the United States Patent and Trademark Office*